(12) United States Patent
Soppin et al.

(10) Patent No.: US 11,487,808 B2
(45) Date of Patent: Nov. 1, 2022

(54) METHOD AND SYSTEM FOR PERFORMING AN OPTIMIZED IMAGE SEARCH

(71) Applicant: Wipro Limited, Bangalore (IN)

(72) Inventors: Shashidhar Soppin, Bangalore (IN); Chandrashekar Bangalore Nagaraj, Bangalore (IN); Manjunath Ramachandra Iyer, Bangalore (IN)

(73) Assignee: Wipro Limited, Bangalore (IN)

(*) Notice: Subject to any disclaimer, the term of this patent is extended or adjusted under 35 U.S.C. 154(b) by 291 days.

(21) Appl. No.: 16/834,545

(22) Filed: Mar. 30, 2020

(65) Prior Publication Data

US 2021/0256053 A1  Aug. 19, 2021

(30) Foreign Application Priority Data

Feb. 17, 2020  (IN) .............................. 202041006781

(51) Int. Cl.
  *G06F 16/532*  (2019.01)
  *G06N 3/08*  (2006.01)
  *G06T 3/40*  (2006.01)

(52) U.S. Cl.
  CPC ............. *G06F 16/532* (2019.01); *G06N 3/08* (2013.01); *G06T 3/40* (2013.01)

(58) Field of Classification Search
  CPC .................................................... G06F 16/532
  USPC ......................................................... 707/713
  See application file for complete search history.

(56) References Cited

U.S. PATENT DOCUMENTS

| | | | |
|---|---|---|---|
| 8,200,025 | B2 | 6/2012 | Woodbeck |
| 10,311,096 | B2 * | 6/2019 | Gu ....................... G06F 16/5838 |
| 11,122,243 | B2 * | 9/2021 | Emig ...................... H04N 9/317 |
| 2013/0024382 | A1 * | 1/2013 | Dala ................... H04L 63/0464 |
| | | | 705/51 |
| 2013/0054603 | A1 * | 2/2013 | Birdwell .............. G06K 9/6224 |
| | | | 707/738 |
| 2013/0249783 | A1 * | 9/2013 | Sonntag ................ G06F 40/169 |
| | | | 704/E15.001 |
| 2016/0350336 | A1 | 12/2016 | Checka et al. |

(Continued)

FOREIGN PATENT DOCUMENTS

| | | |
|---|---|---|
| CN | 105912611 A | 8/2016 |
| CN | 106227851 A | 12/2016 |

*Primary Examiner* — Kimberly L Wilson
(74) *Attorney, Agent, or Firm* — Finnegan, Henderson, Farabow, Garrett & Dunner, LLP

(57) ABSTRACT

The disclosure relates to method and system for performing optimized image search. The method includes receiving an input image and user requirements with respect to an image search, identifying a sub-section from various sub-sections of the input image based on semantic parameters corresponding to each sub-section and the user requirements, and determining an optimal resolution of the sub-section based on a pixel density of various image formats derived for the sub-section. The method further includes identifying an optimal set of layers from a plurality of layers of an Artificial Neural Network (ANN) based image search model for performing the image search based on the semantic parameters for the sub-section, the optimal resolution of the sub-section, and historical data, and performing the image search to identify a set of output images similar to the sub-section based on a modified ANN based image search model comprising the optimal set of layers.

19 Claims, 6 Drawing Sheets

(56) References Cited

U.S. PATENT DOCUMENTS

2016/0358024 A1   12/2016  Krishnakumar et al.
2017/0249339 A1*  8/2017  Lester ..................... G06F 16/56
2017/0278135 A1   9/2017  Majumdar et al.

* cited by examiner

| Convolution Layer Number 402 | Features learned 404 |
|---|---|
| 1 | Color (blue, red, green…) |
| 2 | Edges, corners |
| 3 | Contours, patterns |
| 4 | Text, logo, parts of the object |
| 5 | Features close to real objects like wheel, legs, hands, trees, ball, plates |
| Dense Layers | Whole objects of the input image |

METHOD AND SYSTEM FOR PERFORMING AN OPTIMIZED IMAGE SEARCH

TECHNICAL FIELD

This disclosure relates generally to image processing, and more particularly to method and system for performing an optimized image search using an artificial neural network.

BACKGROUND

Generally, people search for visual content items from one or more media collections using a search interface. Conventional approaches for searching the visual content items includes text-based image search and upload-based image search. In text-based image search, a search relays upon a set of keywords parsed based on a user query. Likewise, upload-based image search involves searching for the content that closely resembles with content of an uploaded input image. However, these conventionally available approaches may return a wide array of results corresponding to the complete input image that may not specifically reflects a content desired by the user. In addition, processing of the complete input image requires more memory for storing intermediate results, and hence may require more processing power and processing time.

Moreover, these conventional approaches compress the complete input image for storing and searching criteria. There is no mechanism available to search a part of the input image before and after compression and decompression. Further, these conventional approaches do not disclose any technique for obtaining search results with matching features and constraints. Therefore, these conventional approaches require more time and memory for processing a search query and for extracting corresponding search results. Additionally, these conventional approaches do not support search based on a region of user interest from the input image. And, if the region of user interest is small then these conventional approaches do not provide any user desired output. Thus, it may be noted that these conventional approaches are limited in their scope and utility.

Therefore, there is a need for a robust and efficient mechanism that may perform an optimized and pattern-based image search, thereby saving processing time and power.

SUMMARY

In one embodiment, a method of performing an optimized image search is disclosed. In one example, the method may include receiving an input image and one or more user requirements with respect to an image search. The method may further include identifying at least one sub-section from a plurality of sub-sections of the input image based on a set of semantic parameters corresponding to each of the plurality of sub-sections and the one or more user requirements. The method may further include determining an optimal resolution of the at least one sub-section based on a pixel density of a plurality of image formats derived for the at least one sub-section. The method may further include identifying an optimal set of layers from a plurality of layers of an Artificial Neural Network (ANN) based image search model for performing the image search based on the set of semantic parameters for the at least one sub-section, the optimal resolution of the at least one sub-section, and historical data. The method may further include performing the image search to identify a set of output images similar to the at least one sub-section based on a modified ANN based image search model comprising the optimal set of layers.

In another embodiment, a system for performing an optimized image search is disclosed. In one example, the system may include a processor and a memory communicatively coupled to the processor, wherein the memory stores processor-executable instructions, which, on execution, may cause the processor to receive an input image and one or more user requirements with respect to an image search. The processor-executable instructions, on execution, may further cause the processor to identify at least one sub-section from a plurality of sub-sections of the input image based on a set of semantic parameters corresponding to each of the plurality of sub-sections and the one or more user requirements. The processor-executable instructions, on execution, may further cause the processor to determine an optimal resolution of the at least one sub-section based on a pixel density of a plurality of image formats derived for the at least one sub-section. The processor-executable instructions, on execution, may further cause the processor to identify an optimal set of layers from a plurality of layers of an ANN based image search model for performing the image search based on the set of semantic parameters for the at least one sub-section, the optimal resolution of the at least one sub-section, and historical data. The processor-executable instructions, on execution, may further cause the processor to perform the image search to identify a set of output images similar to the at least one sub-section based on a modified ANN based image search model comprising the optimal set of layers.

In yet another embodiment, a non-transitory computer-readable storage medium, storing computer-executable instructions for performing an optimized image search, is disclosed. The stored instructions, when executed by a processor, may cause the processor to perform operations including receiving an input image and one or more user requirements with respect to an image search. The operations may further include identifying at least one sub-section from a plurality of sub-sections of the input image based on a set of semantic parameters corresponding to each of the plurality of sub-sections and the one or more user requirements. The operations may further include determining an optimal resolution of the at least one sub-section based on a pixel density of a plurality of image formats derived for the at least one sub-section. The operations may further include identifying an optimal set of layers from a plurality of layers of an ANN based image search model for performing the image search based on the set of semantic parameters for the at least one sub-section, the optimal resolution of the at least one sub-section, and historical data. The operations may further include performing the image search to identify a set of output images similar to the at least one sub-section based on a modified ANN based image search model comprising the optimal set of layers.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
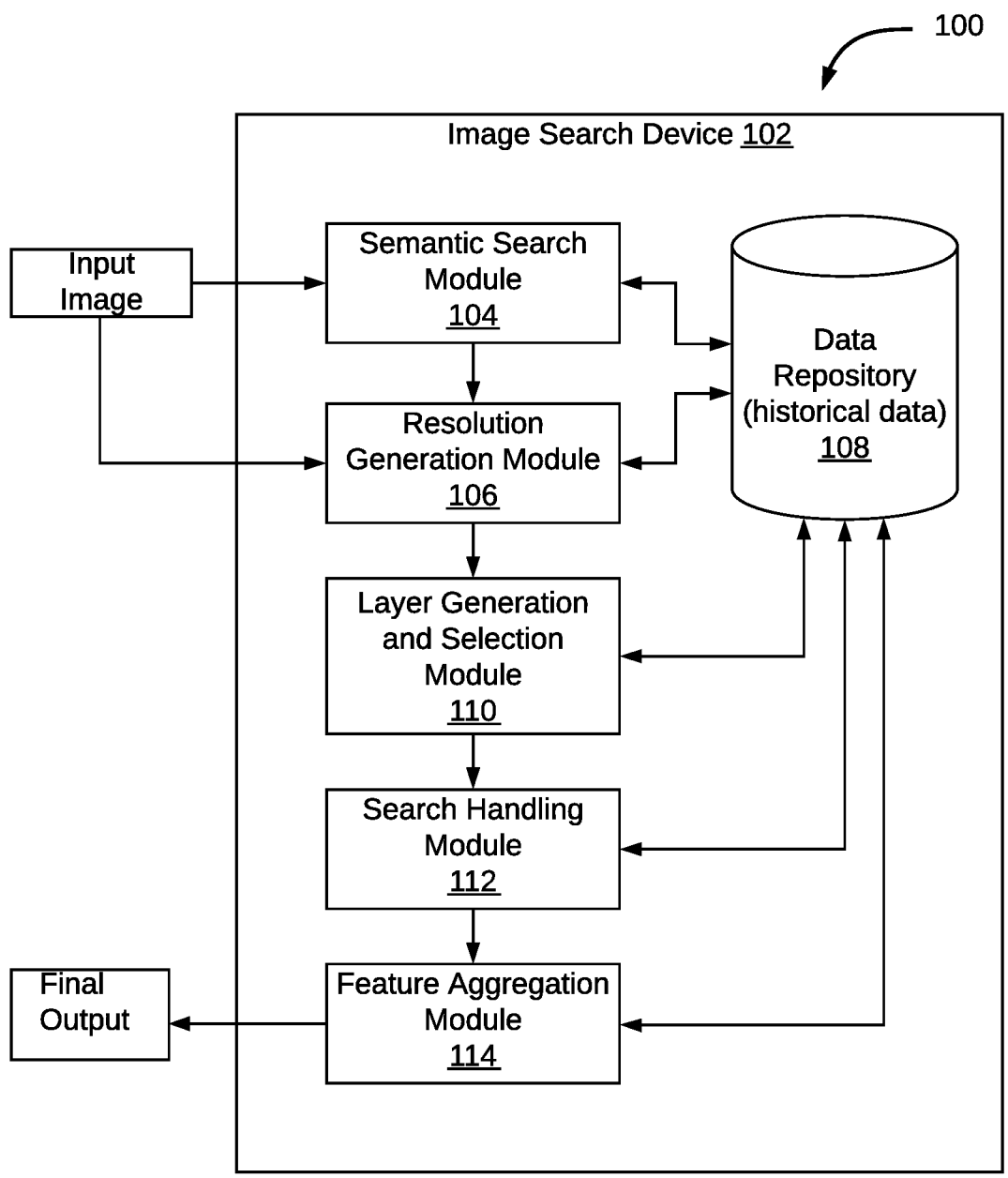
FIG. 1 illustrates a functional block diagram of an exemplary system 100 for performing an optimized image search, in accordance with some embodiments of the present disclosure.

Referring now to FIG. 1, a functional block diagram of an exemplary system 100 for performing an optimized image search is illustrated, in accordance with some embodiment of the present disclosure. In particular, the system 100 may include an image search device 102 which may perform various operations to image search. The image search device 102 may include a semantic search module 104, a resolution generation module 106, a data repository 108, a layer generation and selection module 110, a search handling module 112, and a feature aggregation module 114. The semantic search module 104 may be configured to receive an input image. The input image received may be in any uncompressed image format such as a portable network graphics (PNG) format, bitmap (BMP) format, etc. A size of the input image may be in common intermediate format (CIF) or quarter common intermediate format (QCIF). As will be appreciated, the image search may be performed based on the input image so as to extract a set of output images similar to that of the input image. The semantic search module 104 may generate a set of semantic parameters corresponding to the input image. The set of semantic parameters may include, but may not be limited to, an object in the input image, a size of the object, a color of the object, a dimension of the object, one or more characteristics of the input image, and a quality of the input image. It should be noted that the set of semantic parameters may correspond to a set of filters that are applied to the input image. Thus, semantic parameters are searchable parameters from the image patterns that enables the image search device 102 to determine which neuron gets activated for what kind of attributes. Further, the semantic search module 104 may be configured to send and store the set of semantic parameters in the data repository 108. Moreover, in some embodiments, the semantic search module 104 may identify at least one sub-section from a plurality of sub-sections of the input image. The semantic search module 104 may identify the at least one sub-section based on the set of semantic parameters corresponding to each of the plurality of sub-sections and the one or more user requirements. In such embodiments, the semantic search module 104 may be configured to send and store the at least one sub-sections with the corresponding set of semantic parameters and the one or more user requirements in the data repository 108.

Further, the resolution generation module 106 may also be configured to receive the input image. In an embodiment, the resolution generation module 106 may receive the input image from another interface. On receiving the input image, the resolution generation module 106, may generate an optimal resolution for the input image. In some embodiments, the resolution generation module 106 may be configured to receive at least one sub-section of the input image either from the semantic search module 104 or from the data repository 108. In such embodiments, the resolution generation module 106 may generate the optimal resolution for the at least one sub-section of the input image. Once the optimal resolution is generated, the resolution generation module 106 may send the optimal resolution generated for the input image or the at least one sub-section of the input image (hereinafter, both referred to as input image) to the data repository 108.

The data repository 108 may be configured to receive the set of semantic parameters and the optimal resolution corresponding to the input image (or the at least one sub-section of the input image). The data repository 108 may also store historical data. The historical data stored may contain information corresponding to the input image based on previous image searches. The data repository 108 may also receive an optimal set of layers of an ANN based image search model from the layer generation and selection module 110. Further, the data repository 108 may also receive search results from the search handling module 112. The search results may correspond to a set of output images. Furthermore, the data repository 108 may send the stored search results to the feature aggregation module 114 for refinement of the search results based on one or more user requirement.

The layer generation and selection module 110 may be configured to receive the optimal resolution for the input image (or for the at least one sub-section of the input image) from the resolution generation module 106. Additionally, the layer generation and selection module 110 may fetch the set of sematic parameters corresponding to the input image (or the at least one sub-section of the input image) from the data repository 108. Based on the optimal resolution, the set of semantic parameters, search patterns, and the historical data, the layer generation and selection module 110 may generate a modified ANN based image search model. The modified ANN based image search model includes the optimal set of layers from a plurality of layers of the ANN based image search model. In addition, the search pattern may be used for the input image for which the ANN based image search model does not exist. Further, the layer generation and selection module 110 may also be configured to send the optimal set of layers corresponding to the input image (or at least one sub-section of the input image) to the data repository 108. Further, the layer generation and selection unit 110 may be configured to send the modified ANN based image search model, the set of semantic parameters, and the optimal resolution to the search handling module 112 for generating the search results.

The search handling module 112 may be configured to receive the modified ANN based image search model, the set of semantic parameters and the optimal resolution. On receiving the modified ANN based image search model, the set of semantic parameters, and the optimal resolution, the search handling module 112 may perform the search matching to the one or more user requirement. Based on the search performed, the search handling module 112 may determine the search results. The search results determined may be detailed and exhaustive. The search handling module 112 may also be configured to send the search results to the data repository 108 for storing. Also, the search handling module 112 may be configured to send the search results to the feature aggregation module 114.

The feature aggregation module 114 may be configured to receive the search results from the search handling module 112. Additionally, the feature aggregation module 114 may be configured to receive the search results from the data repository 108. Since, the search results determined are detailed and exhaustive, the feature aggregation module 114 may refine the search results based on the one or more user requirement.

Figure 2:
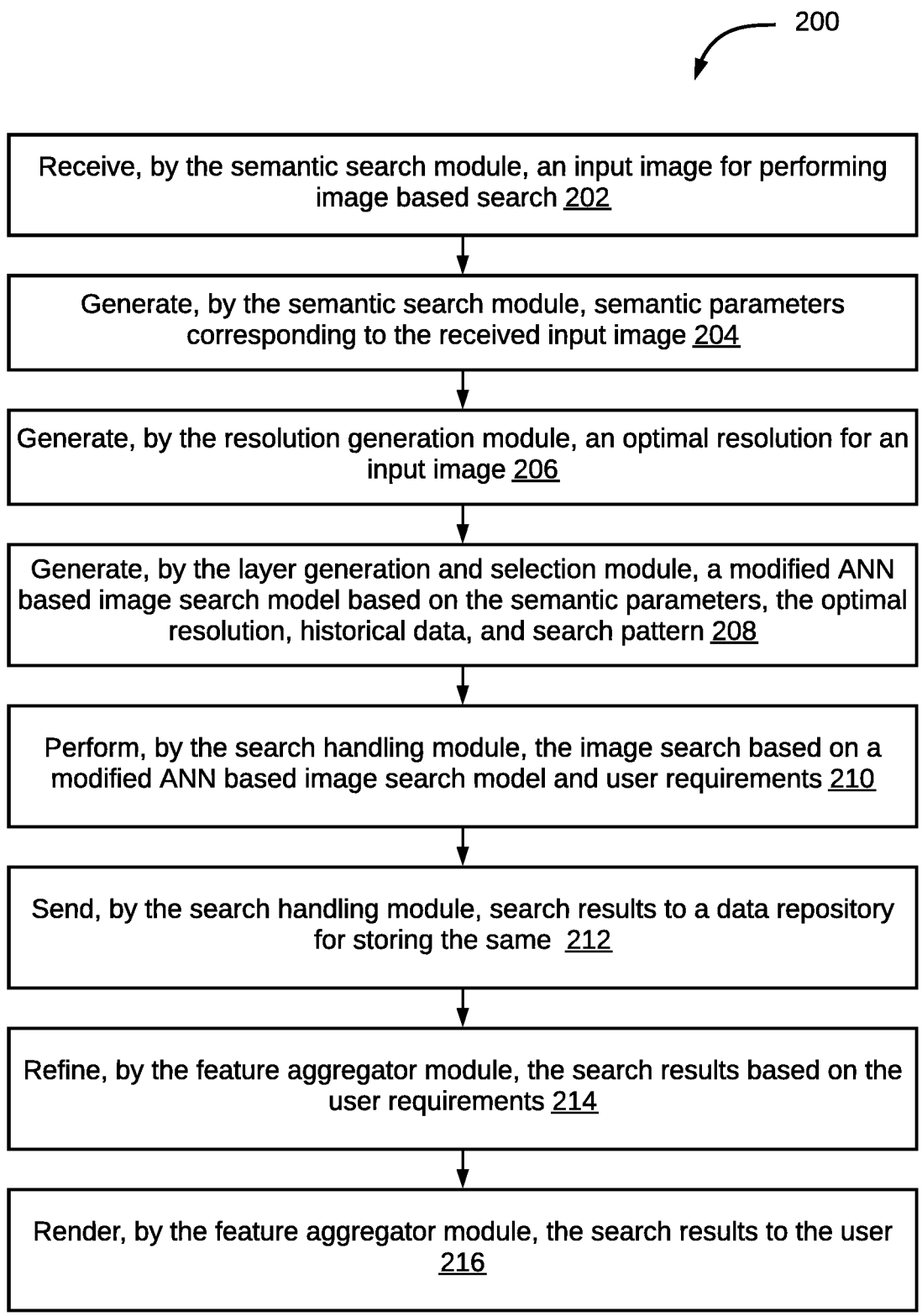
FIG. 2 is a flow diagram of an exemplary process overview for performing an optimized image search, in accordance with some embodiments of the present disclosure.

Referring now to FIG. 2, a detailed exemplary process 200 overview for performing an optimized image search based on data transformation is depicted via a flowchart, in accordance with some embodiments of the present disclosure. Each step of the process 200 may be performed by an image search device 102. At step 202, the semantic search module 104 may receive an input image for performing an optimized image search. The image search may be performed for the input image received for extracting a set of output images similar to the input image. At step 204, the semantic search module 104 may generate a set of semantic parameters corresponding to the received input image. The set of semantic parameters may include but is not limited to at least one of an object, a size of the object, a color of the object, a dimension of the object, one or more characteristics of the input image, or a quality of the input image. Based on the set of semantic parameters, the received input image is distributed into a plurality of sub-sections. Thereafter, based on the set of semantic parameters, at least one sub section from a plurality of sub-section is identified from the input image. The at least one sub-section identified may correspond to a sub-section of the input image that may help in achieving better, faster and accurate search results similar to that of the input image. In addition, one or more parameters from the set of semantic parameters may be decided based on a quality of the search results corresponding to each of the at least one sub-section from the plurality of sub-sections. By way of an example, the one or more parameters from the set of parameters may be considered for determining a part i.e. the at least one sub-section of the input image. Moreover, if none of a combination of the one or more parameters are yielding the search results that are expected to be best, then all parameters in the set of semantic parameters are considered for identifying the at least one sub-section.

Further, in step 204, a mapping of a title corresponding to each of the at least one object is taken care. The mapping of the title corresponding to each of the at least one object is done based on historical data. By way of an example, consider a scenario where an input image with a Cat as an object has Dog as a title. In this scenario, the semantic search module 104 may use the historical data for the mapping of the object Cat in the input image with an accurate title. Once the mapping is performed for the object Cat with the accurate title, then an image search is performed for the input image with the object Cat. In addition, if the title corresponding to the object of the input image is not present in the historical data then an alert message is indicated to a user.

As mentioned earlier the at least one sub-section identified may provide better, faster, and accurate search results. For this, a time taken to perform the image search correspond to each of the at least one sub-section is also determined. Thereafter, the at least one sub-section which may take least time to perform the image search by providing better, faster and accurate search results may be considered. Moreover, the at least one sub-section, the least time taken and the set of semantic parameters corresponding to the input image may be sent for storage in the data repository 108. By way of an example, consider a scenario where there is need to search a biggest leaf from an input image with thousands of leaves. In this scenario, the biggest leaf may be highlighted based on a set of semantic parameters fetched from a data repository 108 corresponding to the input image with thousands of leaves. Further, a least time taken to search the biggest leaf may be considered. The data repository 108 may be then updated with the input image comprising thousands of leaves, the biggest leaf, the associated set of semantic parameters, and the least time taken.

Thereafter, at step 206, an optimal resolution for the input image is generated by the resolution generation module 106. As stated above, in an embodiment, the optimal resolution may be generated for the at least one sub-section from the plurality of sub-sections of the input image. It should be noted that both the original input image and the at least one sub-section may be commonly referred to as input image herein below. The optimal resolution may be generated to reduce the time taken to perform the image search corresponding to the input image. The process of generating the optimal resolution for the input image may act as a pre-processing step for all input images. The optimal resolution generated for the input image may correspond to a best low-resolution image. The best low-resolution image may provide advancement in performing the image search as compared to that of the original input image (or the original sub-section of the input image).

In order to generate the optimal resolution for the input image a pixel density of a plurality of image formats may be derived corresponding to the input image. The plurality of image formats may include but is not limited to a Joint Photographic Experts Group (JPEG) format, a PNG format and a Graphics Interchange Format (GIF) format. From the plurality of image formats, an image format that may take the least time to perform the search may be considered as the optimal resolution for the input image. For this, each of the input image received is converted into a standard image format before the search is initiated. By way of an example, the standard image format considered may correspond to the PNG format. By way of an example, for generating the optimal resolution the input image may be added with filters for faster and better search. The filters added may include color to grayscale, low pass filters (smoothing), high pass filters (edge detection, sharpening), and removal of unwanted data.

By way of an example, considering a scenario when an input image received is of higher resolution i.e. of High-definition (HD) quality or 1020×780 pixels. In this scenario, a time taken to perform an image search may be relatively longer whether the image search is performed using a search engine or in general. And therefore, the input image of higher resolution may provide search results with extra matches that may not be relevant to the input image.

In addition, a convertor is proposed, that may convert an input image received in in a particular format that may take less time to perform the image search. The convertor may be added as a plug-in feature in any browser. An advantage of adding the convertor comprises increased search efficiency, heavy reduction in the time taken to perform the search, faster search rate, saves computational power by reducing the time taken, and doesn't change image format or quality.

Once the optimal resolution is generated, then at step 208, a modified Artificial Neural Network (ANN) based image search model may be generated by the layer generation and selection module 110. The modified Artificial Neural Network (ANN) based image search model may be generated by identifying an optimal set of layers from a plurality of layers of the ANN based image search model. The optimal set of layers corresponds to a set of filters that are applied on the at least one sub-section of the input image The optimal set of layers may be generated based on the set of semantic parameters corresponding to the at least one sub-section, the optimal resolution corresponding to the at least one sub-section, historical data, and search pattern. The ANN based image search model may correspond to a Convolution Neural Network (CNN) model. Moreover, by performing the image search based on the optimal set of layers for the at least one sub-section of the input image, the time taken to perform the image search may get reduced. Therefore, generating the optimal set of layers from the plurality of layers is one of an important aspect for performing the image search. Once the optimal set of layers are generated, then these optimal set of layers are selected for performing the image search corresponding to the at least one sub-section. Thus, the image search needed to be performed for the at least one sub-section of the input image may become easier and more efficient than performing the image search needed to be performed for the complete input image. By way of an example, consider a scenario where the user needs to search a bigger and greener leaf from an input image with a tree. In this case, the user need not use the entire tree image for performing an image search. Moreover, only a selected portion comprising the bigger and greener leaf (i.e., at least a sub-section) may be identified from the input image with the tree. Based on the selected portion identified, an optimal resolution for the selected portion of the image (3×3) may be generated. In an embodiment, padding may be used for determining a boundary conditions for the selected portion. After performing the above-described process, an optimal set of layers may be determined form the plurality of layers of the CNN model. The CNN model may determine the optimal set of layers as Conv2D or Conv3D based on the selected portion. Thereafter, a pooling mechanism may be used for the selected portion and the optimal set of layers.

Additionally, each of the plurality of layers of the ANN based image search model may learn different semantic parameters. Since the ANN based image search model corresponds to the CNN model, so it may be said that the plurality of layers of the CNN model may learn different semantic parameters. This is explained in more detail in conjunction to FIG. 5.

Once the modified ANN based image search model comprising the optimal set of layers is generated, then at step 210, the image search is performed by the search handling module 112 to identify search results similar to the at least one sub-section of the input image. The search results may be identified based on the optimal set of layers, the set of sematic parameters, the optimal resolution, historical data, and one or more user requirement. Moreover, the search results may be identified such that the one or more user requirements are met. Thereafter, at step 212, the search results identified may be send for storing in the data repository 108.

In another embodiment, an image search may be performed by the image search device 102 based on a following procedure: initially, based on a set of semantic parameters at least one sub-section of an input image may be identified by the semantic search module 104. Further, an optimal resolution for the at least one sub-section that may reduce a time taken for search may be generated by the resolution generation module 106. Thereafter, based on identifying the at least one sub-section and the optimal resolution the layer generation and selection module 110 may identify a modified CNN model. Moreover, if the CNN model already exists in the historical data corresponding to the at least one sub-section then there is no need to identify the CNN model. By way of an example, in this case the at least one sub-section identified may correspond to at least one sub-section for which the CNN model already exists in the historical data of the data repository 108. Otherwise if a CNN model corresponding to the at least one sub-section does not exist, then a modified CNN model may be generated on the fly by generating an optimal set of layers.

Further, the at least one sub-section is fed as an input to the modified CNN model. The modified CNN model may generate the search results corresponding to the at least one sub-section. The search results generated may correspond to a most activated cluster of images associated with the optimal set of layers of the modified CNN model. By way of an example, top 1000 activated images may be collected based on each of the optimal set of layers. This may be a first level search for the at least one sub-section. Further, among the 1000 activated images, a set of top 20 images may be selected as per a second level search results and matched to the at least one sub-section of the input image. The closest matching images may be search results rendered to the user. Moreover, if the search results do not match the one or more user requirement, then a set of next top 20 images may be selected from the cluster of 1000 images. This process may be repeated until a matching result corresponding to the at least one sub-section may be found based on the one or more user requirement.

In yet another embodiment, if the search results does not match the one or more user requirement for the set of top 20 images then the set of next top 20 images may be used as an input to the CNN model so as to detect an optimal set of layers that may act as an intermediate filters, which would match to the at least one sub-section of the input image. As these intermediate filters would be used for refining the search results. and each of the intermediate filters may match to the at least one sub-section, but with variations in a percentage of match. For example, if the at least one sub-section corresponds to a long green leaf in the input image of a tree/s. Then the set of top 20 images would match to trees or portions of trees, which have green leaves of varying color gradient, length, different background, and different type of trees. When the set of top 20 images are again provided as the input to the CNN model then, the search results will be obtained which would be closer to the one or more user requirement and selection happens appropriately.

Thereafter, at step 214, the search results corresponding to the at least one sub-section of the input image is refined by the feature aggregation module 114, based on the one or more user requirement. In this step, the search results are ranked based on a plurality of search criteria. In addition, when the user may seek for a single result, then a highest rank result may be rendered to the user. Otherwise a query is prompted to the user associated to the search results for selecting a matching result from the search results based on the one or more user requirement.

Moreover, if the image search has multiple semantic parameters, the image search may be carried for the at least one sub-section that may have low-resolution for one of the multiple semantic parameters. By way of an example, for a requirement of the user to search all plants with long green leaves, then a low-resolution search may be performed for green leaves (which is less subjective) and not over long leaves (more subjective). Thereafter, long leaf search may be performed based on search results of the low-resolution search performed for the green leaves. The set of semantic parameters are hence ordered in the degree of subjectivity based on number of samples available in the data repository 108. By way of an example, for green semantic parameter there may be 20 shades available (when all data objects with green semantic parameter are considered). By way of another example, for length semantic parameter, there may be hundreds running from 1 mm to 1 meter for "leaf" object itself.

After the image search, multiple matching results may be generated corresponding to the at least one section of the input image. The results generated may be weighted based on a degree of matching. By way of an example, w1*degree of matching of green+w2*matching of length+w3*search time+w4*user preference. Further, weight (w1) may be 50% indicating that the search results generated for the green semantic parameter may be 50% accurate. For this, the user may be more particular about color (green) in the search results matched. Similarly, w2 may be 30% (for the semantic parameter 'length'), while w3 may be 10% (for the semantic parameter 'search time' that may indicate ease of search). Further, w4 may indicate the one or more user requirement. By way of an example, while searching for red shirts, shirts with a particular pattern of interest based on the one or more user requirement may be made to appear first. Thereafter, at step 216, the feature aggregation module 114 may render the search results to one or more user based on the one or more user requirement.

Figure 3:
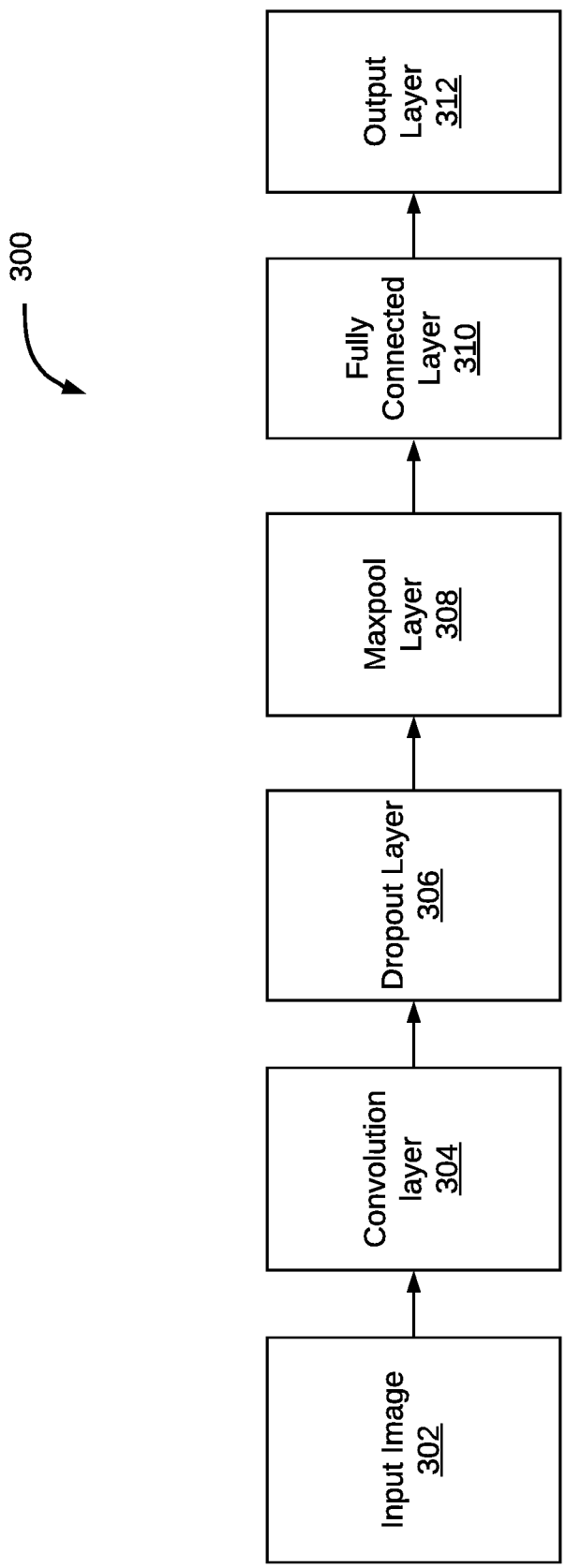
FIG. 3 represent layers of an exemplary Artificial Neural Network (ANN) based image search model for performing an image search, in accordance with some embodiments of the present disclosure.

Referring now to FIG. 3, a number of layers of an exemplary Artificial Neural Network (ANN) based image search model for performing an optimized image search is illustrated, in accordance with some embodiments of the present disclosure. In FIG. 3 a model 300 may be represent. The model 300 represents the ANN based image search model. The ANN based image search model may correspond to the CNN model. The model 300 may be responsible for searching a set of output images similar to that of an input image. The model 300 includes an input layer 302, a convolution layer 304, a dropout layer 306, a maxpool layer 308, a fully connected layer 310, and an output layer 312. In an embodiment, the input layer 302 may receive and hold the input image. The input layer 302 may then feed the input image to the convolution layer 304 for further processing. The convolution layer 304 may then process the input image based on a set of features learned. The set of features learned may correspond to the set of semantic parameters. The set of features learned are generated based on repeated application of a feature from a set of features learned corresponding to the input image. The input image along with each of a corresponding feature from the set of features learned may be send to the dropout layer 306. The dropout layer 306 may drop additional features that are not relevant to the input image, from the each of the corresponding feature. The additional features are dropped to reduce overfitting of the model 300. The dropout layer 306 mainly functions when the model 300 is being trained. Moreover, the dropout layer 306 may correspond to a regularization technique that may lower capacity of the model 300, so as to reduce a gap of training and testing of the model 300.

Thereafter, the input image along with each of the corresponding filter is passed to the maxpool layer 308. The maxpool layer 308 may be used to reduce a spatial dimension i.e. a size of the input image. By reducing the spatial dimension of the input image, the maxpool layer 308 makes computation fast and easy, and, in turn, reduces the memory consumption. Further, the fully connected layer 310 may receive processed input (i.e. the input image with the each of the corresponding filter and the reduced spatial dimensions) from the maxpool layer 308 for further processing. Based on the inputs received, the fully connected layer 310 may generate the set of output images corresponding to the input image by classifying the input images based on a class score. The class score may correspond to the associated weight. Thereafter, the fully connected layer 310 may send the generated set of output to the output layer 312 for display.

Figure 4:
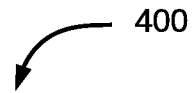
FIG. 4 represents an exemplary table depicting layers of the ANN based image search model corresponding to a set of features, in accordance with some embodiment of the present disclosure.

Referring now to FIG. 4, an exemplary table depicting layers of an ANN based image search model with a set of features learned is represented, in accordance with some embodiment of the present disclosure. In reference to FIG. 4, the ANN based image search model may correspond to a CNN model. The table 400 depicts layers of the CNN model 402 along with the set of features learned 404. The set of features learned 404 may be used to perform the image search for generating the set of output images corresponding to the input image. The set of features learned evolves from a first layer of the CNN model and end at a last layer of the CNN model. By way of an example, the CNN model starts learning colors followed by contours, edges, corners, bounding shapes, text, variations of text, parts of the object, sub-objects of the image and the complete input image is learned at the last layer of the CNN model. The last layer of CNN model may correspond to the fully connected layer. At each layer of the CNN model 402 the set of features learned 404 may get activated and may contribute to perform the image search whereas remaining does not. Moreover, if a feature from the set of features learned does not match to that of the input image, then the set of output images may not be generated. In addition, if a feature matches with the set of features learned then it may be used to generate the set of output images. This, in turn, may reduce the time taken to perform the image search.

Thus, based on the input image and each of the corresponding feature, the layers of the CNN model 402 may be identified from the table 400. Based on the layers identified, their corresponding set of features learned may be used to perform the image search. Therefore, the set of features learned 404 may provide an additional advantage to match the input image to closest matching feature from the set of features learned. This may reduce the time taken to perform the image search and hence, minimize the image search complexity.

Figure 5:
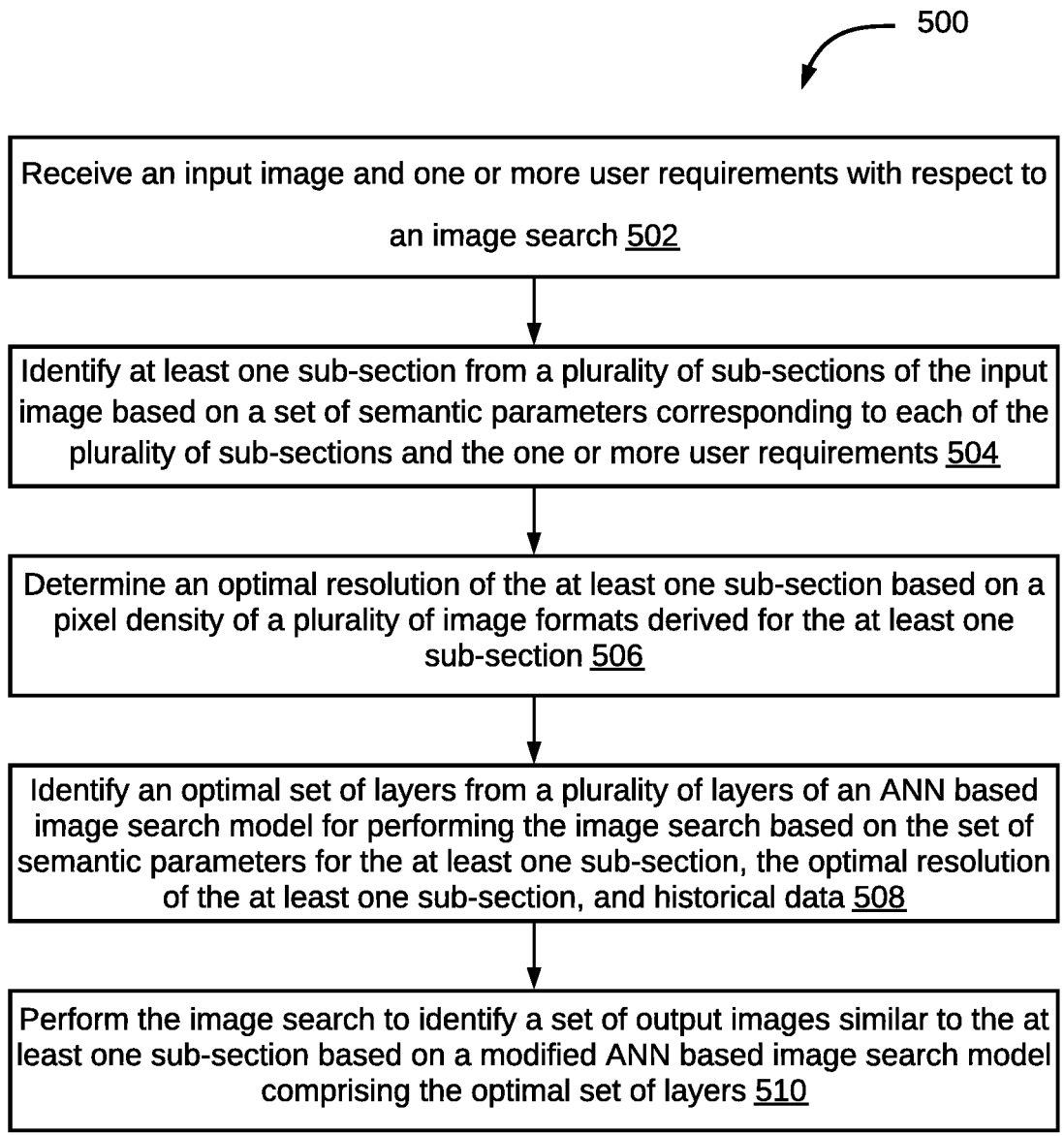
FIG. 5 is a flow diagram of an exemplary process for performing an optimized image search, in accordance with some embodiments of the present disclosure

Referring now to FIG. 5, a flow diagram of an exemplary method for performing an optimized image search is depicted via a flowchart, in accordance with some embodiments of the present disclosure. At step 502, an input image is received along with one or more user requirement in order to perform an image search. Based on the input image received, at step 504, at least one sub-section from a plurality of sub-sections of the input image may be identified based on a set of semantic parameters corresponding to each of the plurality of sub-sections and the one or more user requirements. The set of semantic parameters may correspond to at least one of an object, a size of the object, a color of the object, a dimension of the object, one or more characteristics of the input image, or a quality of the input image. At step 506, an optimal resolution may be determined for the at least one sub-section. The optimal resolution may correspond to a low-resolution image. Based on the optimal resolution determined for the at least one sub-section an associated time taken to perform the image search may get reduced. Moreover, the optimal resolution for the at least one sub-section may be determined based on a pixel density of a plurality of image formats derived for the at least one sub-section. At step 508, an optimal set of layers may be identified from a plurality of layers of an Artificial Neural Network (ANN) based image search model. The ANN based image search model may correspond to the CNN model. The optimal set of layers corresponding to the at least one sub-section may be identified based on the set of semantic parameters for the at least one sub-section, the optimal resolution of the at least one sub-section, and historical data. At step 510, the image search is performed to identify a set of output images similar to the at least one sub-section of the input image, based on a modified ANN based image search model. The modified ANN based image search model may be the part of the ANN based image search model comprising the optimal set of layers corresponding to the at least one sub-section.

An applicability of proposed invention in the present disclosure is explained via an example. Consider a scenario where a user "John" notices a scratch on his car. In this scenario, John may want to check "how much amount of insurance money John may likely receive for the scratch". By using the proposed invention, John may upload an image of a part of the car, which include scratches. Based on the proposed invention, John may be able to detect similar car images with similar scratches (very closely matching scars). Moreover, with the help of proposed invention, John may be able to gather information about the amount of insurance granted for the scratch on the car. John may use this information to claim right amount of money from an insurance company.

Considering another example for the proposed invention. Consider a scenario where a user visits a botanical garden and finds a plant with large number of red roses. In this scenario, the user wants to know if there is any garden with a plant of large number of white flowers similar to that of the botanical garden. For this, the user may upload an image of the plant with the red rose as an input image. Based on the proposed invention, on receiving the input image, all similar plants with red and white flowers may be extracted. And, as per user requirement for white flowers, search results may be fine-tuned and may be render to the user with a set of output images.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
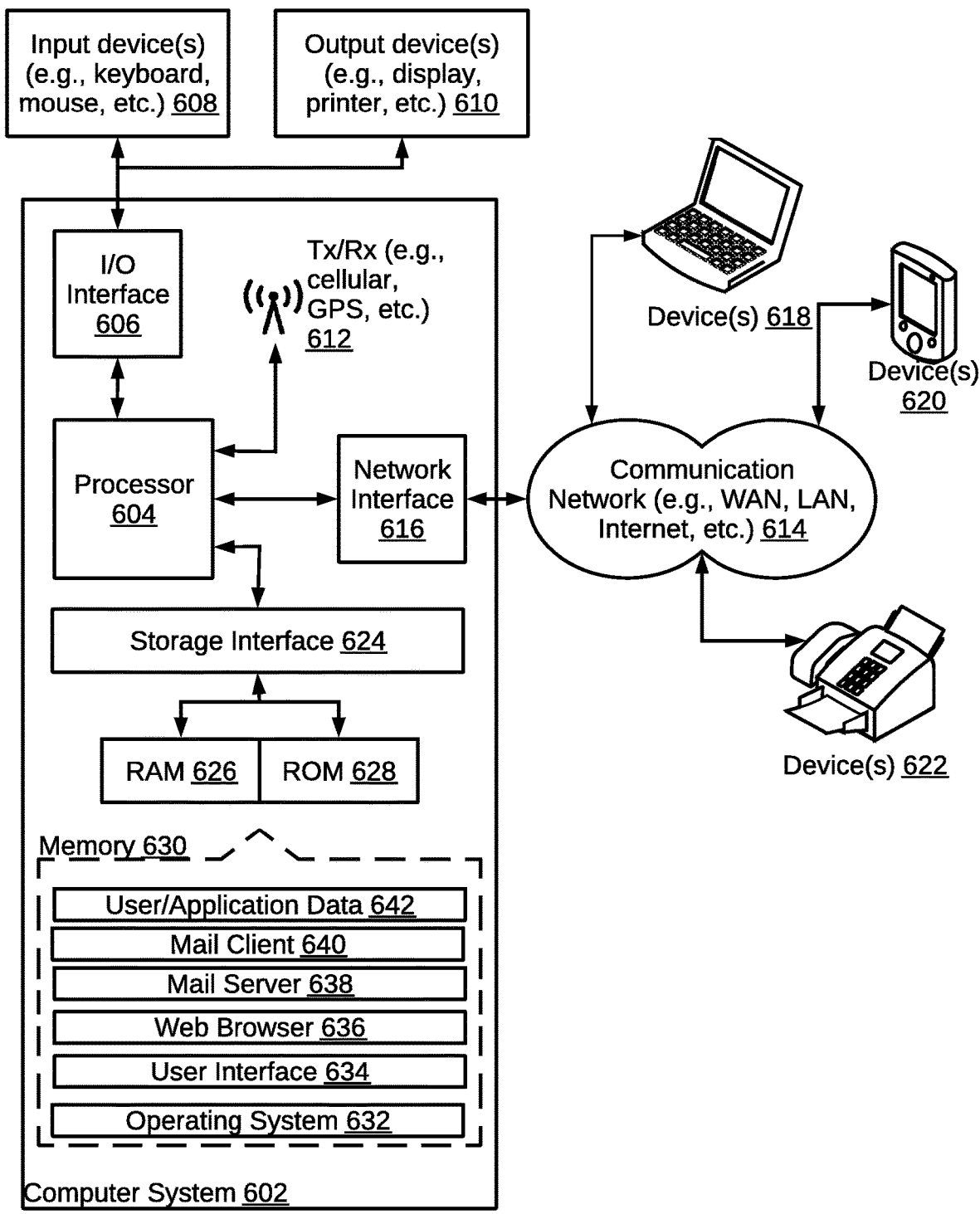
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, a block diagram of an exemplary computer system 602 for implementing various embodiments consistent with the present disclosure is illustrated. Computer system 602 may include a central processing unit ("CPU" or "processor") 604. Processor 604 may include at least one data processor for executing program components for executing user or system-generated requests. A user may include a person, a person using a device such as those included in this disclosure, or such a device itself. Processor 604 may include specialized processing units such as integrated system (bus) controllers, memory management control units, floating point units, graphics processing units, digital signal processing units, etc. Processor 604 may include a microprocessor, such as AMD® ATHLON® microprocessor, DURON® microprocessor OR OPTERON® microprocessor ARM's application, embedded or secure processors, IBM® POWERPC®, INTEL'S CORE® processor, ITANIUM® processor, XEON® processor, CELERON® processor or other line of processors, etc. Processor 604 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 604 may be disposed in communication with one or more input/output (I/O) devices via an I/O interface 606. I/O interface 606 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 606, computer system 602 may communicate with one or more I/O devices. For example, an input device 608 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 610 may be a printer, fax machine, video display (for example, cathode ray tube (CRT), liquid crystal display (LCD), light-emitting diode (LED), plasma, or the like), audio speaker, etc. In some embodiments, a transceiver 612 may be disposed in connection with processor 604. Transceiver 612 may facilitate various types of wireless transmission or reception. For example, transceiver 612 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 604 may be disposed in communication with a communication network 614 via a network interface 616. Network interface 616 may communicate with communication network 614. Network interface 616 may employ connection protocols including, without limitation, direct connect, Ethernet (for example, twisted pair 10/100/1000 Base T), transmission control protocol/internet protocol (TCP/IP), token ring, IEEE 802.11a/b/g/n/x, etc. Communication network 614 may include, without limitation, a direct interconnection, local area network (LAN), wide area network (WAN), wireless network (for example, using Wireless Application Protocol), the Internet, etc. Using network interface 616 and communication network 614, computer system 602 may communicate with devices 618, 620, and 622. These devices 618, 620, and 622 may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® e-reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 602 may itself embody one or more of these devices 618, 620, and 622.

In some embodiments, processor 604 may be disposed in communication with one or more memory devices (for example, RAM 626, ROM 628, etc.) via a storage interface 624. Storage interface 624 may connect to memory 630 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 630 may store a collection of program or database components, including, without limitation, an operating system 632, user interface application 634, web browser 636, mail server 638, mail client 640, user/application data 642 (for example, any data variables or data records discussed in this disclosure), etc. Operating system 632 may facilitate resource management and operation of computer system 602. Examples of operating systems 632 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 634 may facilitate display, execution, interaction, manipulation, or operation of program components through textual or graphical facilities. For example, user interfaces 634 may provide computer interaction interface elements on a display system operatively connected to computer system 602, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 602 may implement a web browser 636 stored program component. Web browser 636 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers 636 may utilize facilities such as AJAX, DHTML, ADOBE® FLASH® platform, JAVASCRIPT® programming language, JAVA® programming language, application programming interfaces (APIs), etc. In some embodiments, computer system 602 may implement a mail server 638 stored program component. Mail server 638 may be an Internet mail server such as MICROSOFT® EXCHANGE® mail server, or the like. Mail server 638 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 638 may utilize communication protocols such as internet message access protocol (IMAP), messaging application programming interface (MAPI), Microsoft Exchange, post office protocol (POP), simple mail transfer protocol (SMTP), or the like. In some embodiments, computer system 602 may implement a mail client 640 stored program component. Mail client 640 may be a mail viewing application, such as APPLE MAIL®, mail client, MICROSOFT ENTOURAGE® mail client, MICROSOFT OUTLOOK® mail client, MOZILLA THUNDERBIRD® mail client, etc.

In some embodiments, computer system 602 may store user/application data 642, such as the data, variables, records, etc. as described in this disclosure. Such databases may be implemented as fault-tolerant, relational, scalable, secure databases such as ORACLE® database or SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The techniques described in various embodiments discussed above provide for performing an optimized image search based on a modified CNN model. The techniques further identify at least one sub-section of an input image for which the image search is performed. The techniques further identify an optimal set of layers of a CNN model that may be required to perform the image search. As will be appreciated, the optimal set of layers identified may reduce amount of time taken to perform the image search and may provide more accurate results corresponding to the at least one sub-section.

In some embodiments, the techniques provide method and system for performing an optimized image search. The techniques provided helps in performing the image search based on historical image database that may support constraints. (and relaxed constraints if not all the constraints are satisfied). The techniques provided helps in performing accurate and optimized search as quickly as possible without losing much information. Further, the techniques provided also helps in performing search for large images that may take less time. This may help in performing quick search for bulk of images. Moreover, with the help of present technique, a compression and de-compression of images may become faster and easier.

The specification has described method and system for performing an optimized image search. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of performing an optimized image search, the method comprising:
   receiving, by an image search device, an input image and one or more user requirements with respect to an image search;
   identifying, by the image search device, at least one sub-section from a plurality of sub-sections of the input image based on a set of semantic parameters corresponding to each of the plurality of sub-sections and the one or more user requirements;
   determining, by the image search device, an optimal resolution of the at least one sub-section based on a pixel density of a plurality of image formats derived for the at least one sub-section;
   identifying, by the image search device, an optimal set of layers from a plurality of layers of an Artificial Neural Network (ANN) based image search model for performing the image search based on the set of semantic parameters for the at least one sub-section, the optimal resolution of the at least one sub-section, and historical data; and
   performing, by the image search device, the image search to identify a set of output images similar to the at least one sub-section based on a modified ANN based image search model comprising the optimal set of layers.

2. The method of claim 1, further comprising segmenting the input image into the plurality of sub-sections based on the set of semantic parameters.

3. The method of claim 1, wherein the set of semantic parameters comprises at least one of an object in the input image, a size of the object, a color of the object, a dimension of the object, one or more characteristics of the input image, or a quality of the input image.

4. The method of claim 1, wherein the optimal resolution for the at least one sub-section comprises a low-resolution image so as to reduce an associated search time.

5. The method of claim 1, wherein the optimal set of layers corresponds to a set of filters that are applied on the at least one sub-section of the input image, and wherein each layer in the optimal set of layers incorporates different semantic parameters from the set of semantic parameters.

6. The method of claim 1, wherein the historical data is stored in a data repository and is employed as a reference for analyzing the at least one sub-section of the input image.

7. The method of claim 6, wherein the data repository is updated by storing the set of output images along with the at least one sub-section of the input image and the optimal set of layers for performing the image search with respect to the input image.

8. The method of claim 1, further comprising generating a weight associated with each image in the set of output images based on a degree of match between the each image and the at least one sub-section of the input image.

9. The method of claim 1, further comprising rendering the set of output images to at least one of a user and a system.

10. A system for performing an optimized image search, the system comprising:
    an image search device comprising a processor, and a memory communicatively coupled to the processor, wherein the memory stores processor-executable instructions, which, on execution, causes the processor to:

receive an input image and one or more user requirements with respect to an image search;

identify at least one sub-section from a plurality of sub-sections of the input image based on a set of semantic parameters corresponding to each of the plurality of sub-sections and the one or more user requirements;

determine an optimal resolution of the at least one sub-section based on a pixel density of a plurality of image formats derived for the at least one sub-section;

identify an optimal set of layers from a plurality of layers of an Artificial Neural Network (ANN) based image search model for performing the image search based on the set of semantic parameters for the at least one sub-section, the optimal resolution of the at least one sub-section, and historical data; and perform the image search to identify a set of output images similar to the at least one sub-section based on a modified ANN based image search model comprising the optimal set of layers.

11. The system of claim 10, wherein the processor-executable instructions, on execution, further cause the processor to segment the input image into the plurality of sub-sections based on the set of semantic parameters.

12. The system of claim 10, wherein the set of semantic parameters comprises at least one of an object in the input image, a size of the object, a color of the object, a dimension of the object, one or more characteristics of the input image, or a quality of the input image.

13. The system of claim 10, wherein the optimal resolution for the at least one sub-section comprises a low-resolution image so as to reduce an associated search time.

14. The system of claim 10, wherein the optimal set of layers corresponds to a set of filters that are applied on the at least one sub-section of the input image, and wherein each layer in the optimal set of layers incorporates different semantic parameters from the set of semantic parameters.

15. The system of claim 10, wherein the historical data is stored in a data repository and is employed as a reference for analyzing the at least one sub-section of the input image.

16. The system of claim 15, wherein the data repository is updated by storing the set of output images along with the at least one sub-section of the input image and the optimal set of layers for performing the image search with respect to the input image.

17. The system of claim 10, wherein the processor-executable instructions, on execution, further cause the processor to generate a weight associated with each image in the set of output images based on a degree of match between the each image and the at least one sub-section of the input image.

18. The system of claim 10, wherein the processor-executable instructions, on execution, further cause the processor to render the set of output images to at least one of a user and a system.

19. A non-transitory computer-readable medium storing computer-executable instructions for:

receiving an input image and one or more user requirements with respect to an image search;

identifying at least one sub-section from a plurality of sub-sections of the input image based on a set of semantic parameters corresponding to each of the plurality of sub-sections and the one or more user requirements;

determining an optimal resolution of the at least one sub-section based on a pixel density of a plurality of image formats derived for the at least one sub-section;

identifying an optimal set of layers from a plurality of layers of an Artificial Neural Network (ANN) based image search model for performing the image search based on the set of semantic parameters for the at least one sub-section, the optimal resolution of the at least one sub-section, and historical data; and performing the image search to identify a set of output images similar to the at least one sub-section based on a modified ANN based image search model comprising the optimal set of layers.

* * * * *